United States Patent
Negi

(12) 
(10) Patent No.: US 6,181,730 B1
(45) Date of Patent: Jan. 30, 2001

(54) PULL-IN CIRCUIT FOR PSEUDO-RANDOM PATTERN

(75) Inventor: Keiji Negi, Tokyo (JP)

(73) Assignee: Ando Electric Co., Ltd., Tokyo (JP)

(*) Notice: Under 35 U.S.C. 154(b), the term of this patent shall be extended for 0 days.

(21) Appl. No.: 09/031,712

(22) Filed: Feb. 27, 1998

(30) Foreign Application Priority Data

Feb. 27, 1997 (JP) ................................... 9-043922

(51) Int. Cl.$^7$ ............................. H04K 1/00; H04B 15/00; H04L 27/30
(52) U.S. Cl. ........................................... 375/142; 714/704
(58) Field of Search .................................. 375/130, 140, 375/142, 143, 150, 152, 367; 714/704

(56) References Cited

U.S. PATENT DOCUMENTS 5,528,635 * 6/1996 Negi ...................................... 375/367
5,732,089 * 3/1998 Negi ...................................... 714/704

* cited by examiner

Primary Examiner—Chi H. Pham
Assistant Examiner—Jean B. Corrielus
(74) Attorney, Agent, or Firm—Pillsbury Madison & Sutro LLP

(57) ABSTRACT

A pull-in circuit of the present invention which can shorten the time of the pull-in operation. The pull-in circuit comprises: a pseudo-random pattern operating circuit for operating an operated pseudo-random pattern on the basis of consecutive bits of the parallel receiving data; a comparison circuit for comparing the operated pseudo-random pattern with a receiving pattern of the receiving data corresponding to the operated pseudo-random pattern; a one-shot circuit for passing a first pulse outputted from the comparison circuit when the operated pseudo-random pattern is coincident with the receiving pattern; a parallel pseudo-random pattern generation circuit for generating the reference parallel pseudo-random pattern when the first pulse passes through the one-shot circuit; a delay circuit for delaying the receiving data; and a bit error detection circuit for detecting a bit error, which compares the receiving data outputted from the delay circuit with the reference parallel pseudo-random pattern.

4 Claims, 8 Drawing Sheets

FIG.3
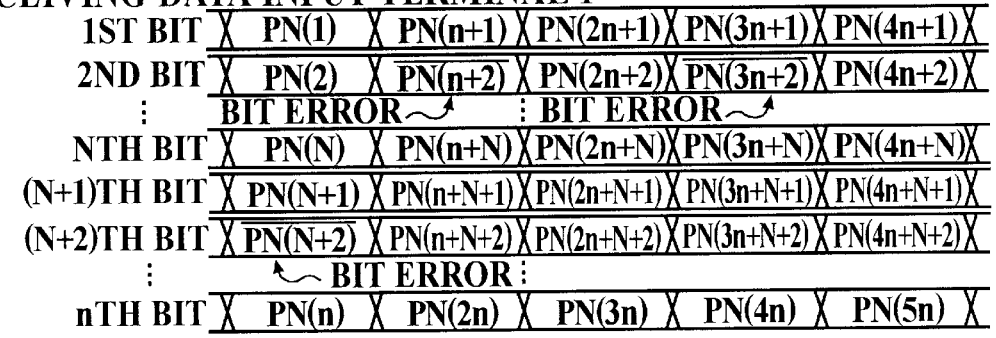
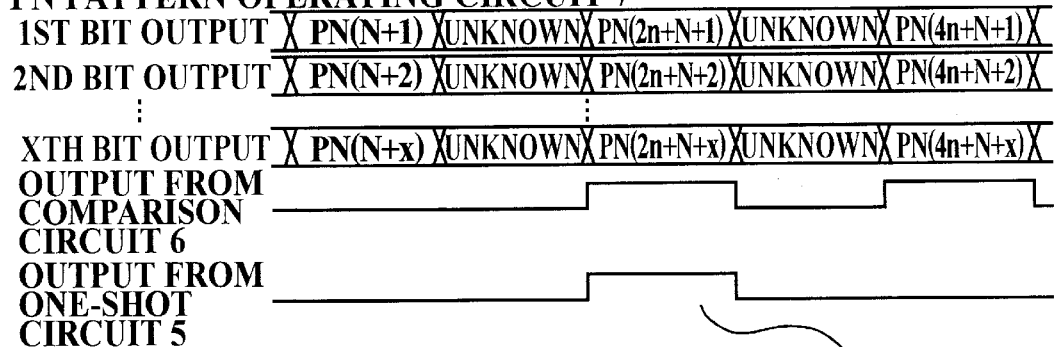
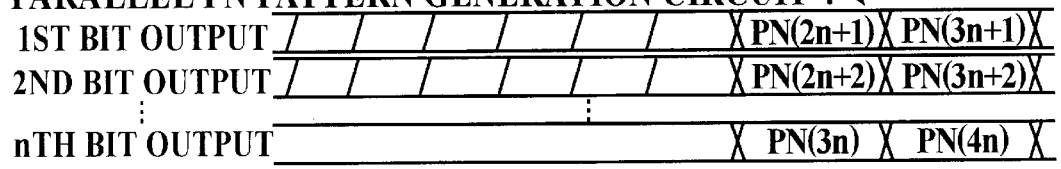
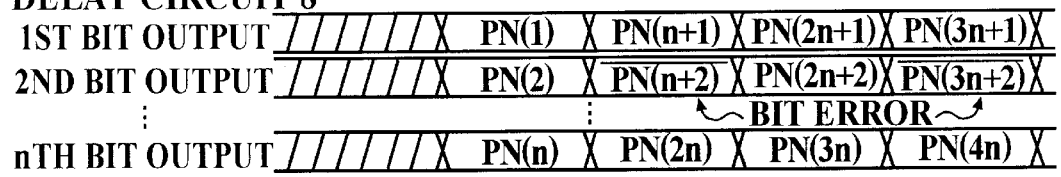
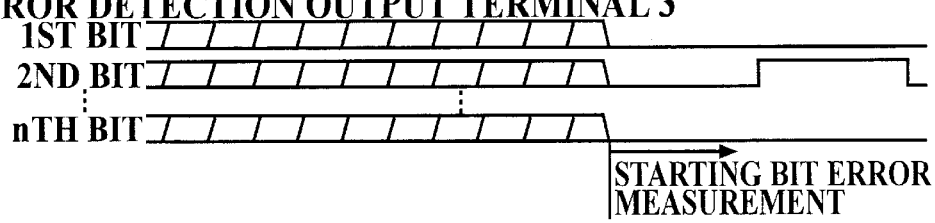

FIG.5
*PRIOR ART*
RECEIVING-DATA INPUT TERMINAL 1
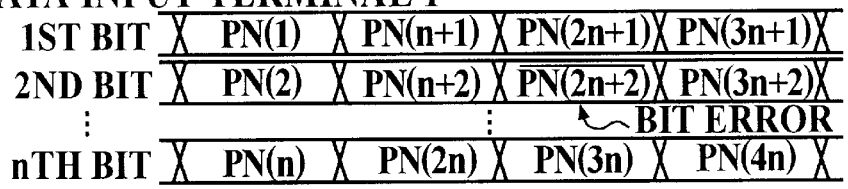
LATCH SIGNAL INPUT TERMINAL 12
PARALLEL PN PATTERN GENERATION CIRCUIT 4
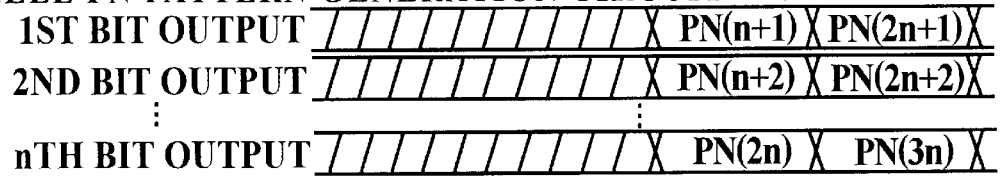
DELAY CIRCUIT 8
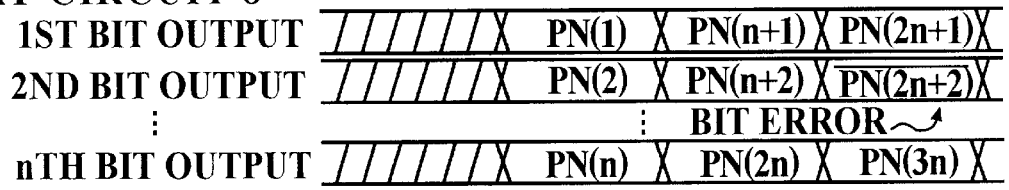
BIT ERROR DETECTION OUTPUT TERMINAL 3
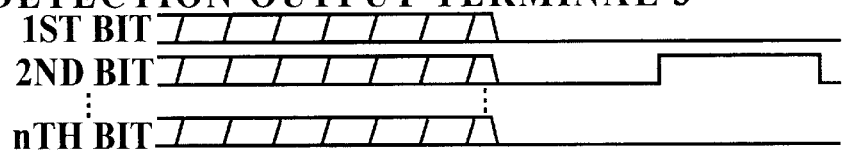

FIG.6
PRIOR ART

```
RECEIVING-DATA INPUT TERMINAL 1
    1ST BIT  X  PN(1)   X  PN(n+1) X PN(2n+1)X PN(3n+1)X
    2ND BIT  X  PN(2)   X  PN(n+2) X PN(2n+2)X PN(3n+2)X
             : BIT ERROR⤴              :
    nTH BIT  X  PN(n)   X  PN(2n)  X  PN(3n)  X  PN(4n)  X

LATCH SIGNAL INPUT          ⎯⎯⎯⎯⎯⎯⎯⎯⎯
TERMINAL 12

PARALLEL PN PATTERN GENERATION CIRCUIT 4
    1ST BIT OUTPUT /////////////// X PN(n+1) XUNKNOWNX
    2ND BIT OUTPUT /////////////// X PN(n+2) XUNKNOWNX
             :                          ↖BIT ERROR
    nTH BIT OUTPUT /////////////// X PN(2n)  XUNKNOWNX

DELAY CIRCUIT 8
    1ST BIT OUTPUT ///////X PN(1) X PN(n+1) X PN(2n+1)X
    2ND BIT OUTPUT ///////X PN(2) X PN(n+2) X PN(2n+2)X
             :                          ↖BIT ERROR
    nTH BIT OUTPUT ///////X PN(n) X PN(2n)  X PN(3n)  X

BIT ERROR DETECTION OUTPUT TERMINAL 3
                ////////\        /UNKNWON
                                 UNMEASURABLENESS
```

PULL-IN CIRCUIT FOR PSEUDO-RANDOM PATTERN

BACKGROUND OF THE INVENTION

1. Field of the Invention

The present invention relates to an evaluation device for a bit error. In particular, the present invention relates to a pull-in circuit for a pseudo-random pattern (hereinafter, it may be described as "PN pattern", wherein "PN" is an abbreviation for "Pseudo Noise"), which carries out a pull-in operation of a PN pattern transmitted from a transmitter device to a receiver device and a reference PN pattern generated by a PN pattern generation circuit in a receiver device.

2. Description of Related Art

In order to evaluate a bit error of a receiving signal of a communication device, a transmission device, a transmission line or the like, a PN pattern is used frequently. In an evaluation device for evaluating a bit error of the receiving signal, the receiving signal is compared with a reference signal generated in a receiver device, so that a bit error is detected.

In the concrete, when a PN pattern generated in a transmitter device is received by a receiver device through a device, transmission device or the like, the received PN pattern is compared with a reference PN pattern generated by a PN pattern generation circuit in a receiver so that a bit error is detected. In such an evaluation device for a bit error, a pull-in circuit for a PN pattern is required in order to synchronize the received PN pattern with the reference PN pattern.

FIG. 4 shows a block diagram of a conventional pull-in circuit for a PN pattern. As shown in FIG. 4, reference numeral 1 denotes a receiving-data input terminal, 3 denotes a bit error detection output terminal, 4 denotes a parallel PN pattern generation circuit, 8 denotes a delay circuit, 9 denotes a bit error detection circuit, 10 denotes a latch data input terminal of the parallel PN pattern generation circuit 4, 11 denotes a latch signal input terminal of the parallel PN pattern generation circuit 4 and 12 denotes a latch signal input terminal.

In the above-mentioned elements, the parallel PN pattern generation circuit 4 which outputs a parallel PN pattern having n bits, will be explained.

FIG. 7 shows a block diagram of a series PN pattern generation circuit which is a prototype circuit of the parallel PN pattern generation circuit 4. The series PN pattern generation circuit outputs a serial PN pattern. The series PN pattern generation circuit comprises a shift register having x flip-flop circuits 21-1 to 21-x, and an exclusive OR circuit 23 which operates an exclusive OR of the outputs from the first flip-flop circuit 21-1 and the jth flip-flop circuit 21-j and which outputs the result of the exclusive OR operation to the Xth flip-flop circuit 21-X. In FIG. 7, reference numeral 21 denotes a serial PN pattern input terminal, and therefrom a PN pattern having x stages outputs in $(2^x-1)$ bits cycle. The characteristic of the series PN pattern generation circuit is expressed the following characteristic equation, if the number of j is a proper value determined by each stage number.

$$f(a)=a^x+a^j+1 \quad (1)$$

From the characteristic equation, a reference PN pattern is determined.

In a measuring instrument operating at higher speed, a serial signal is converted to a parallel signal, so that a signal processing is carried out at lower speed. That is, on a transmitter side, a parallel signal is generated and is converted into a serial signal to be processed at higher speed at a multiplexing circuit after a signal processing of the parallel signal. On a receiver side, the serial signal is received and is converted into a parallel signal to be processed at lower speed at a dividing circuit. Subsequently, a signal processing of the parallel signal is carried out.

The PN pattern generation circuit outputting a parallel PN pattern is called a parallel PN pattern generation circuit. In such a parallel PN pattern generation circuit, a parallel PN pattern is obtained by converting a serial PN pattern into a parallel PN pattern. Because a pattern obtained after the sampling in a constant cycle is the same PN pattern as before the sampling, each bit outputted from a parallel PN pattern generation circuit forms the same PN pattern.

FIG. 8 shows a block diagram of a concrete configuration of a parallel PN pattern generation circuit 4 which outputs a parallel PN pattern. The parallel PN pattern generation circuit 4 has flip-flop circuits 34-1 to 34-n for inputting n parallel signals and an exclusive OR circuit 36 for operating the following PN pattern. Further, the parallel PN pattern generation circuit 4 has a latch data input terminal 31, a latch signal input terminal 32 and selection circuits 35-1 to 35-n to input initial values to the flip-flops 34-1 to 34-n. When a PN pattern is outputted from the parallel PN pattern generation circuit 4, the selection circuits 35-1 to 35-n select the output from the exclusive OR circuit 36. On the other hand, when initial values are set to the flip-flop circuits 34-1 to 34-n, the selection circuits 35-1 to 35-n select the input of the latch data input terminal 31 according to the status of the latch signal input terminal 32.

The operation of a pull-in circuit for a PN pattern shown in FIG. 4 will be explained with reference to a time chart as shown in FIG. 5. In FIG. 5, in order to explain the operation, each bit of a receiving data is named PN(1), PN(2) or the like. In this case, it is assumed that a bit error occurs at the bit PN(2n+2) so that the pattern is received erroneously.

A serial receiving data to be measured for a bit error, which is received by a receiver device from the receiving-data input terminal 1, is converted into a parallel receiving data having n bits, and thereafter the parallel receiving data is inputted to the pull-in circuit. On the other hand, a latch signal is inputted to a latch signal input terminal 12 so that the receiving data is inputted to the flip-flop circuits in a parallel PN pattern generation circuit 4. As a result, the receiving data is synchronized with the PN pattern outputted from the parallel PN pattern generation circuit 4, so that a bit error measurement can be carried out.

A receiving data is inputted to flip-flop circuits, so that the parallel PN pattern generation circuit 4 generates a reference parallel PN pattern having n bits for a bit error measurement by using the bits PN(1) to PN(n) inputted thereto as initial values.

The receiving data is compared with the reference PN pattern by delaying the receiving data at a delay circuit 8 while the receiving data and the reference PN pattern are carried out the pull-inoperation. The bits outputted from the delay circuit 8 are compared with those outputted from the parallel PN pattern generation circuit 4 corresponding thereto at the bit error detection circuit 9. In the concrete, as shown in the time chart of FIG. 5, the delay circuit 8 outputs a receiving data to delay the output for one clock, so that the bits outputted from the delay circuit 8 are compared with those outputted from the parallel PN pattern generation circuit 4 corresponding thereto at the bit error detection circuit 9. As a result, the bit error detection circuit 9 outputs the result of the comparison to the bit error detection output terminal 3. In this case, because the bit PN(2n+2) is received erroneously, a bit error detection signal is generated toward the bit PN(2n+2), and is outputted to the bit error detection output terminal 3.

As described above, in a conventional pull-in circuit for PN pattern, a receiving data inputted into the receiving-data input terminal 1 is inputted to the parallel PN pattern generation 4 by a latch signal inputted to the latch signal input terminal 12. The parallel PN pattern generation 4 outputs the reference PN pattern generated by using the inputted values as initial values and synchronized with a receiving data, so that the pull-in operation is carried out. During the pull-in operation, a latch signal is inputted to the latch signal input terminal 12 at an arbitrary timing. Therefore, there is possibility that the parallel PN pattern generation circuit 4 inputs the bit having a bit error, so that the parallel PN pattern generation 4 generates a reference PN pattern by using erroneous initial values.

The example of the above-mentioned case is shown in a time chart of FIG. 6. FIG. 6 shows the time chart to explain the operation of a conventional pull-in circuit as shown in FIG. 4 when the bit error measurement cannot be carried out. In the time chart of FIG. 6, each bit of the signal inputted into the receiving-data input terminal 1 is named PN(1), PN(2) or the like. Further, it is assumed that a bit error occurs at the bit PN(n+2).

After the reception of the receiving data, a latch signal is inputted to the latch signal input terminal 12 in order to carry out the pull-in operation. Because of the latch signal, initial values are set to the parallel PN pattern generation circuit 4. However, a bit error occurs at the receiving data latched by inputting the latch signal, so that the erroneous data is set to the parallel PN pattern generation circuit 4. Therefore, the following state of the parallel PN pattern generation circuit 4 outputs another unknown pattern which is not synchronized with the receiving data. As a result, because the receiving data is not synchronized with the reference data, a bit error measurement cannot be carried out. Subsequently, it is detected that the receiving data is not synchronized with the reference data. It is necessary that the latch signal is inputted again to latch the receiving data having no bit errors.

That is, in a conventional pull-in circuit for PN pattern, the receiving data inputted into the receiving-data input terminal 1 is inputted to the parallel PN pattern generation circuit 4 by the signal inputted to the latch signal input terminal 12 at an arbitrary timing, so that the pull-in operation of the receiving data and the reference data is carried out. There is possibility to input the bit having a bit error to the parallel PN pattern generation circuit 4. In this case, it is detected that the receiving data is not synchronized with the reference data, so that it is necessary to carry out the pull-in operation again. As a result, there is a problem that it takes longer to carry out the pull-in operation.

SUMMARY OF THE INVENTION

The present invention was developed in order to solve the above-mentioned problems. An object of the present invention is to provide a pull-in circuit which can shorten the time of the pull-in operation.

In accordance with one aspect of the present invention, the pull-in circuit for pseudo-random pattern for carrying out a pull-in of a parallel receiving data having n bits inputted into a receiving-data input terminal and a parallel pseudo-random pattern having n bits generated by a parallel pseudo-random pattern generation circuit, and for inputting the parallel receiving data to the parallel pseudo-random pattern generation circuit in accordance with a latch signal received by a latch signal input terminal; comprising: a pseudo-random pattern operating circuit for operating a pseudo-random pattern, which inputs consecutive N bits of the receiving data and outputs a pseudo-random pattern having consecutive x bits which do not have common bits with the N bits; a comparison circuit for comparing the consecutive x bits outputted from the pseudo-random pattern operating circuit with other consecutive x bits of the receiving data corresponding to the consecutive x bits, which outputs a coincidence detection signal if the consecutive x bits are entirely coincident with the other consecutive x bits; a one-shot circuit for passing only a first pulse outputted from the comparison circuit after a start signal is outputted to a latch start signal input terminal, which outputs the pulse to the latch signal input terminal of the parallel pseudo-random pattern generation circuit; a delay circuit for delaying the receiving data; and a bit error detection circuit for detecting a bit error, which receives an output from the delay circuit and an output from the parallel pseudo-random generation circuit, which compares each bit of the output from the delay circuit with that of the output from the parallel pseudo-random generation circuit and which outputs a result thereof to a bit error detection output terminal.

The consecutive x bits and the other consecutive x bits inputted to the comparison circuit may be data following the consecutive N bits inputted to the pseudo-random pattern operating circuit. The number of the N may be not less than a PN-stage number of a pseudo-random pattern generated by the parallel pseudo-random pattern generation circuit.

In such a pull-in circuit, there is less possibility that the parallel PN pattern generation circuit sets erroneous bits to the initial values, so that it takes shorter to carry out the pull-in operation.

BRIEF DESCRIPTION OF THE DRAWINGS

The present invention will become more fully understood from the detailed description given hereinbelow and the accompanying drawings which are given by way of illustration only, and thus do not limit the present invention, and wherein;

FIG. 3 is a time chart showing the operation of a pull-in circuit shown in FIG. 1;

FIG. 5 is a time chart showing the operation of a pull-in circuit shown in FIG. 4;

FIG. 6 is a time chart showing the operation of a pull-in circuit when the bit error measurement cannot be carried out;

DESCRIPTION OF THE PREFERRED EMBODIMENT

Figure 1:
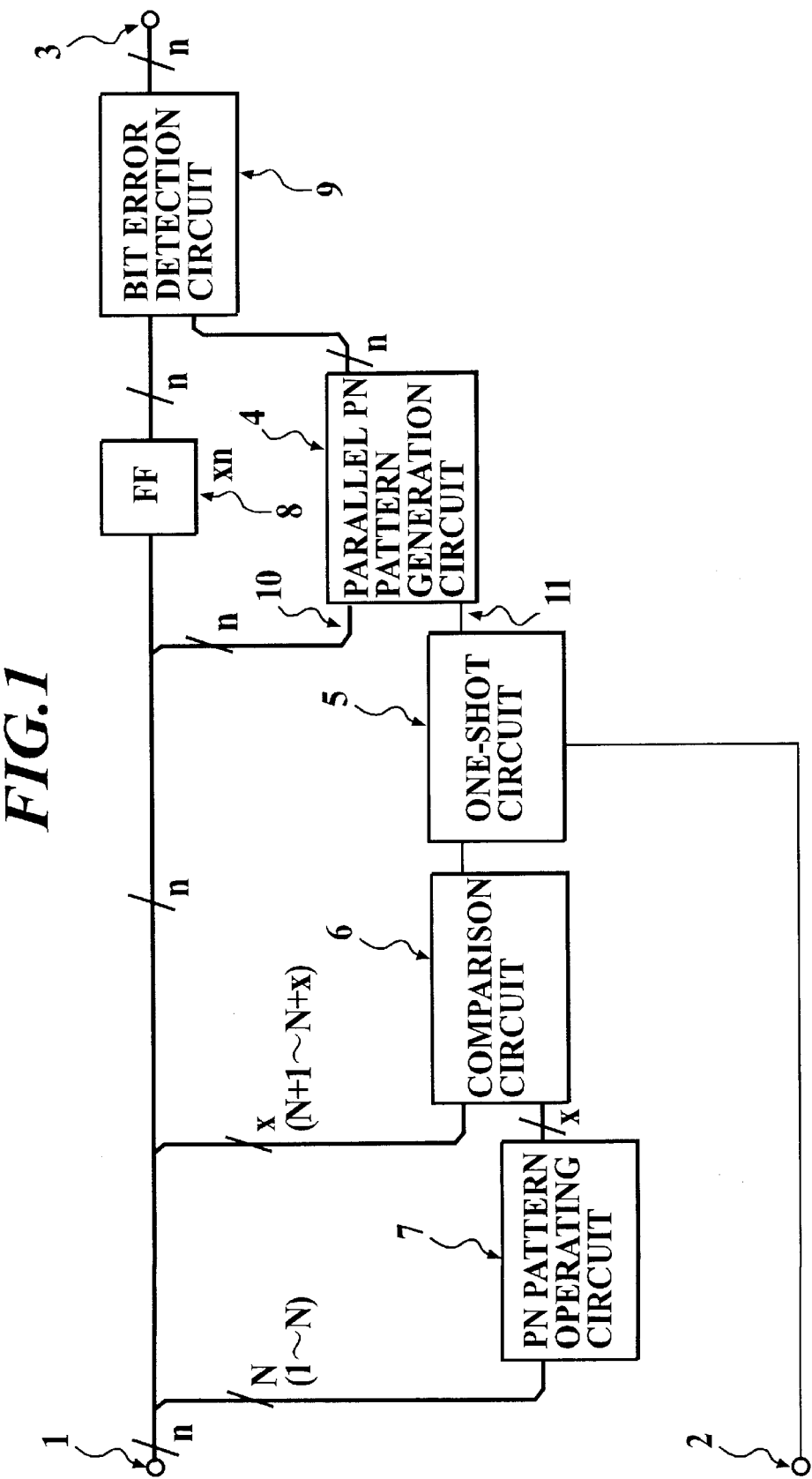
FIG. 1 is a block diagram showing an embodiment of a pull-in circuit for PN pattern of the present invention.

The present invention will be explained below with reference to the drawings. FIG. 1 shows a block diagram of an embodiment of the present invention. In FIG. 1, 1 denotes a receiving-data input terminal, 2 denotes a latch start signal input terminal, 3 denotes a bit error detection output terminal, 4 denotes a parallel PN pattern generation circuit, 5 denotes a one-shot circuit, 6 denotes a comparison circuit, 7 denotes a PN pattern operating circuit, 8 denotes a delay circuit, 9 denotes a bit error detection circuit, 10 denotes a latch data input terminal of the parallel PN pattern generation circuit 4 and 11 denotes a latch signal input terminal of the parallel PN pattern generation circuit 4.

As shown in FIG. 1, the receiving data inputted into the receiving-data input terminal 1 is inputted to the delay circuit 8 and the latch data input terminal 10 of the parallel PN pattern generation circuit 4. The consecutive N bits in the receiving data are inputted to the PN pattern operating circuit 7. By using the inputted N bits pattern train, a PN pattern train having x bits, which is several bits apart from the N bits pattern train is operated. The operation is carried out at the PN pattern operating circuit 7.

Figure 2:
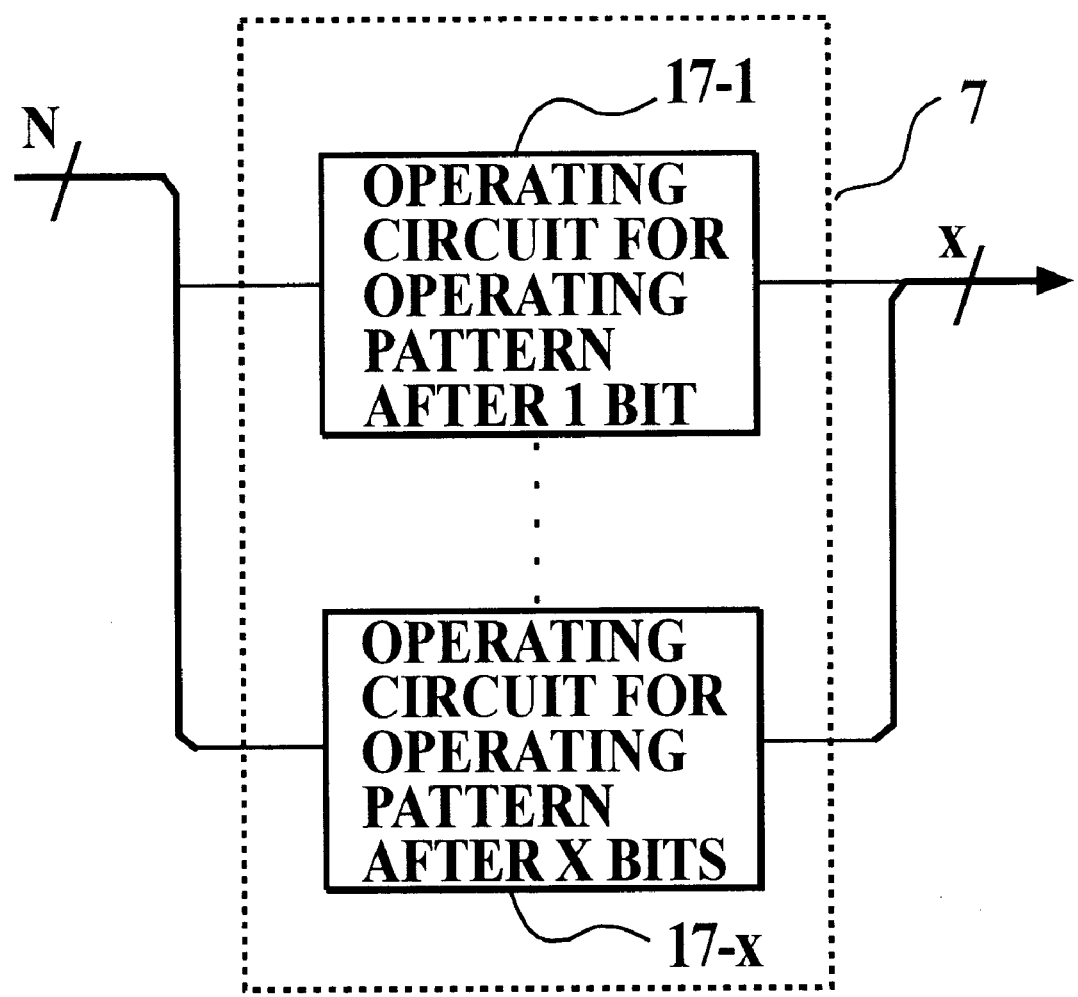
FIG. 2 is a block diagram showing a PN pattern operating circuit in the embodiment shown in FIG. 1.
Figure 4:
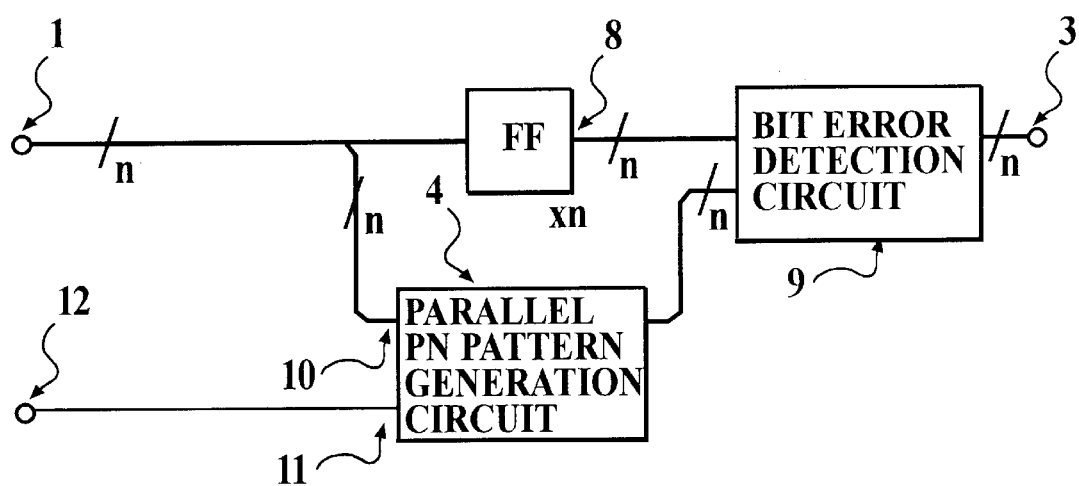
FIG. 4 is a block diagram showing an example of a conventional pull-in circuit for PN pattern.
Figure 7:
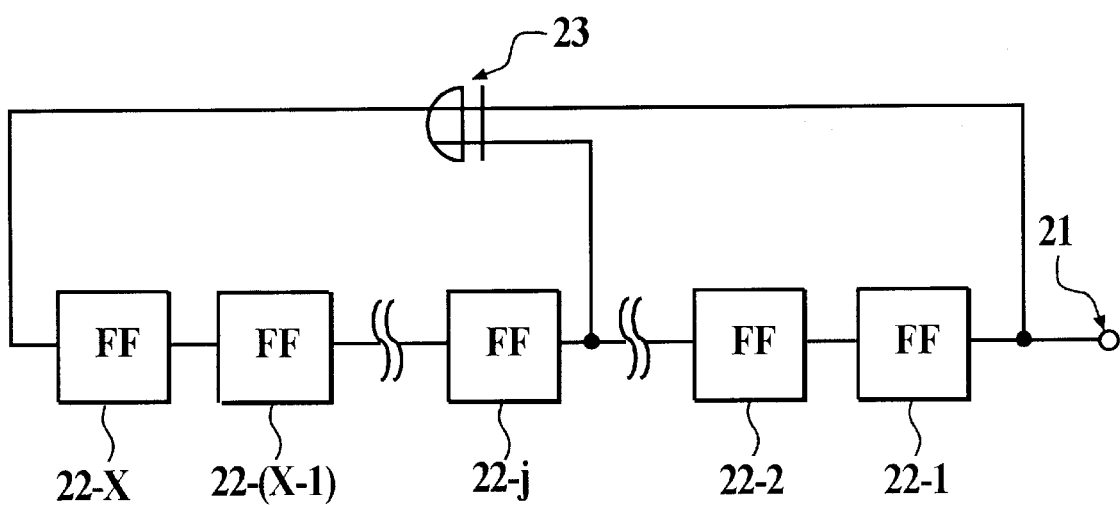
FIG. 7 is a block diagram showing a PN pattern generation circuit for generating a serial PN pattern.

The composition of the PN pattern operating circuit 7 will be explained as follows. FIG. 2 shows a block diagram of the PN pattern operating circuit 7. In FIG. 2, 17-i (i=1 to x) denotes an operating circuit for operating pattern after i bits.

In such an operating circuit for operating pattern after i bits, in order to determine a PN pattern delayed for i bits from a certain PN pattern train, a remainder equation r(a) is calculated by dividing $a^i$ by the characteristic equation f(a) of the PN pattern. The operating circuit for operating pattern after i bits is composed of exclusive OR on the basis of the remainder equation r(a). For example, in the case that a characteristic equation is $$f(a) = a^7 + a^1 + 1 \quad (2)$$

and a PN-stage number is 7, when the value of the bit PN(y+8) which is the bit after 8 bits from a certain bit PN(y) is determined, the remainder equation r(a) is calculated by dividing $a^8$ by the characteristic equation of Equation (2). In this case, the remainder equation r(a) is $$r(a) = a^2 + a^1. \quad (3)$$

When a circuit composed of exclusive OR circuits is substituted for the remainder equation, exclusive OR operation of the corresponding bit can be carried out. In this case, the exclusive OR of the bit PN(y+2) which is the bit after 2 bits from a certain bit PN (y) and the bit PN(y+1) which is the bit after 1 bit is operated.

As described above, by the operating circuit for operating PN pattern after i bits from a certain PN pattern train, another PN pattern having consecutive x bits is determined.

The degree of the remainder r(a) is necessarily smaller than that of the characteristic equation f(a), that is, the PN-stage number X of a PN pattern obtained by the PN pattern operating circuit 7. This means that the values of the following bits within X bits from an arbitrary bit PN(y) in a PN pattern are necessary to determine the bit PN (y+i) which is i bits apart from a bit PN(y). That is, it is necessary that the number of bits N of a pattern inputted to the PN pattern operating circuit 7 is not less than PN-stage number X.

Another PN pattern train determined from the pattern inputted to the PN pattern operating circuit 7 is inputted to one input terminal of the comparison circuit 6. In the n bits received by the receiving-data input terminal 1, the bits corresponding to the outputs from the PN pattern operating circuit 7 are inputted to the other input terminal of the comparison circuit 6. For example, when the bits from the first to the Nth received by the receiving-data input terminal 1 are inputted to the PN pattern operating circuit 7 and the following PN pattern having consecutive x bits is outputted from the PN pattern generating circuit 7 to one input terminal of the comparison circuit 6, the bits from the (N+1)th to the (N+x)th received by the receiving-data input terminal 1 are inputted to the other input terminal of the comparison circuit 6. In the comparison circuit 6, each bit of one input data is compared with that of the other data, so that coincidence detection signal is outputted if each bit of one input data is entirely coincident with that of the other.

The one-shot circuit 5 inputs the output signal from the comparison circuit 6 and the signal from the latch start signal input terminal 2. The output from the one-shot circuit 5 is inputted to the latch signal input terminal 11 of the parallel PN pattern generation circuit 4. In the one-shot circuit 5, only the first pulse outputted from the comparison circuit 6 is passed after a signal is inputted to the latch start signal input terminal 2, and subsequently, the other pulses cannot be passed to close the gate thereof.

Figure 8:
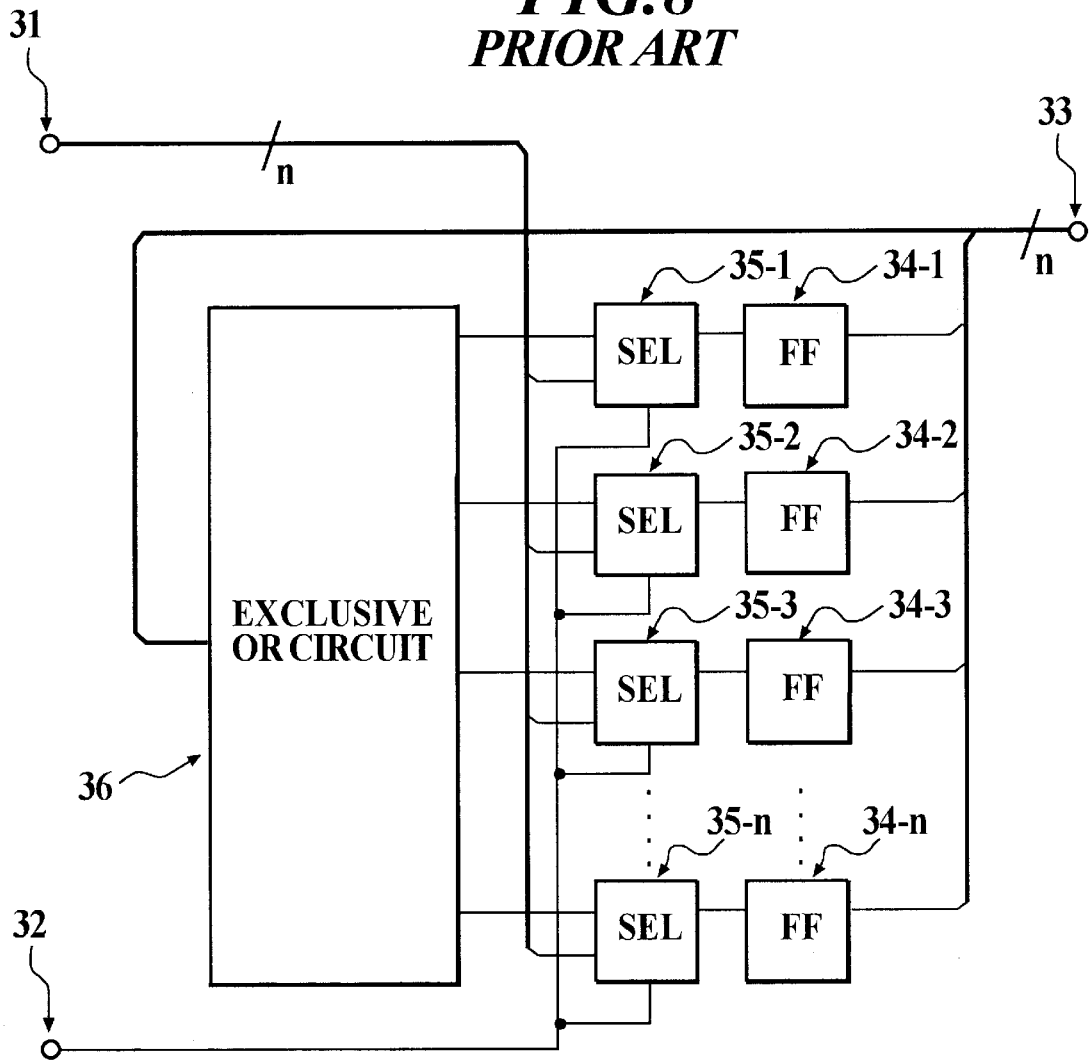
FIG. 8 is a block diagram showing a parallel PN pattern generation circuit for generating a parallel PN pattern having n bits.

The parallel PN pattern generation circuit 4 is composed as shown in FIG. 8. A pulse is inputted from the one-shot circuit 5 to the parallel PN pattern generation circuit 4, so that the parallel PN pattern generation circuit 4 inputs the pattern inputted into the receiving-data input terminal 1 as initial values and thereafter outputs the following PN pattern. The bit error detection circuit 9 compares the output from the delay circuit 8 delaying the receiving data with that from the parallel PN pattern generation circuit 4 for generating the reference PN pattern, and outputs the bit error detection signal generated toward the different bit between two outputs to the bit error detection output terminal 3.

The operation of the PN pattern generation circuit shown in FIG. 1 will be explained with reference to the time chart of FIG. 3. As shown in FIG. 3, similarly to the time chart of FIG. 5, each bit of the receiving data is named PN(1), PN(2) or the like, and it is assumed that the bits PN(N+2), PN(n+2) and PN(3n+2) are received erroneously.

A parallel receiving data having n bits to be measured for a bit error is inputted to the receiving-data input terminal 1. In order to synchronize the receiving data with a reference pattern, a latch start signal is inputted to the latch start signal input terminal 2.

The latch signal start signal is inputted, so that on the basis of the bits from the first to the Nth, the consecutive PN pattern having the following x bits is operated in the PN pattern operating circuit 7. For example, as shown in the time chart, in the initial state that the bits PN(1) to PN(n) are inputted to the receiving-data input terminal 1, the PN pattern operating circuit 7 operates the consecutive PN pattern having x bits so that the bits PN(N+1) to PN(N+x) of the PN pattern train are outputted. In the case that the bit PN(n+2) is inputted to the receiving-data input terminal 1 erroneously, the erroneous PN pattern is inputted to the PN pattern operating circuit 7 so that an unknown pattern is outputted. Similarly to the initial state, in the following states, if there is no bit error at the bits from the first to the Nth of the receiving data, the following PN pattern train is outputted from the PN pattern operating circuit 7. On the other hand, if there is a bit error, an unknown pattern is outputted to the PN pattern operating circuit 7.

In the comparison circuit 6, the bits from the (N+1)th to the (N+x)th inputted into the receiving-data input terminal 1 are compared with the outputs from the PN pattern operating circuit 7, so that a coincidence pulse is outputted if each bit of one input data is entirely coincident with that of the other. In the initial state, because the (N+2)th bit is erroneously received by the receiving-data input terminal 1, the comparison circuit 6 does not output a pulse. In the second state, because the bit PN(n+2) is received erroneously, another unknown pattern is outputted from the PN pattern operating circuit 7 so that the comparison circuit 6 does not output a coincidence pulse. In the third state, the bits from PN(2n+1) to PN(3n) having no bit errors are inputted, so that a coincidence detection pattern is outputted.

The one-shot circuit 5 outputs only the first pulse from the time that a signal is inputted to the latch start signal input terminal 2. In the time chart of FIG. 3, only the first pulse is outputted, and thereafter the pulses are not outputted.

When the one-shot circuit 5 outputs the pulse, the parallel PN pattern generation circuit 4 inputs the bits from PN(2n+1) to PN(3n) received by the receiving-data input terminal 1, so that the receiving data is synchronized with the reference PN pattern. After the synchronization, the bit error measurement is started. Because the bit error occurs at the bit PN(3n+2) and the bit PN(3n+2) is received erroneously, the bit error detection circuit 9 detects the bit error so that the detection signal generated toward the second bit of the bit error detection output terminal 3 is outputted.

As descried in detail, in the pull-in circuit for PN pattern of the present invention, another PN pattern which is several bits apart from an inputted PN pattern is operated at the PN pattern operating circuit 7. The result of the operation is compared with the bits of the receiving data corresponding thereto, and thereafter only the data which are coincident with each other are set as initial values of the parallel PN pattern generation circuit. As a result, there is less possibility that the parallel PN pattern generation circuit sets erroneous bits to the initial values, so that it takes shorter to carry out the pull-in operation.

What is claimed is:

1. A pull-in circuit for pseudo-random pattern for carrying out a pull-in of a parallel receiving data having n bits inputted into a receiving-data input terminal and a parallel pseudo-random pattern having n bits generated by a parallel pseudo-random pattern generation circuit, and for inputting the parallel receiving data to the parallel pseudo-random pattern generation circuit in accordance with a latch signal received by a latch signal input terminal; comprising:

a pseudo-random pattern operating circuit for operating a pseudo-random pattern, which inputs consecutive N bits of the receiving data and outputs a pseudo-random pattern having consecutive x bits which do not have common bits with the N bits;

a comparison circuit for comparing the consecutive x bits outputted from the pseudo-random pattern operating circuit with other consecutive x bits of the receiving data corresponding to the consecutive x bits, which outputs a coincidence detection signal if the consecutive x bits are entirely coincident with the other consecutive x bits;

a one-shot circuit for passing only a first pulse outputted from the comparison circuit after a start signal is outputted to a latch start signal input terminal, which outputs the pulse to the latch signal input terminal of the parallel pseudo-random pattern generation circuit;

a delay circuit for delaying the receiving data; and a bit error detection circuit for detecting a bit error, which receives an output from the delay circuit and an output from the parallel pseudo-random generation circuit, which compares each bit of the output from the delay circuit with that of the output from the parallel pseudo-random generation circuit and which outputs a result thereof to a bit error detection output terminal.

2. A pull-in circuit as claimed in claim 1, wherein the consecutive x bits and the other consecutive x bits inputted to the comparison circuit are data following the consecutive N bits inputted to the pseudo-random pattern operating circuit.

3. A pull-in circuit as claimed in claim 1, wherein a number of the N is not less than a PN-stage number of a pseudo-random pattern generated by the parallel pseudo-random pattern generation circuit.

4. A pull-in circuit for pseudo-random pattern for carrying out a pull-in of a parallel receiving data inputted into a receiving-data input terminal and a reference parallel pseudo-random pattern, comprising:

a pseudo-random pattern operating circuit for operating an operated pseudo-random pattern on the basis of consecutive bits of the parallel receiving data, wherein each bit of the operated pseudo-random pattern is not common with that of the consecutive bits;

a comparison circuit for comparing the operated pseudo-random pattern with a receiving pattern of the receiving data corresponding to the operated pseudo-random pattern;

a one-shot circuit for passing a first pulse outputted from the comparison circuit when the operated pseudo-random pattern is coincident with the receiving pattern;

a parallel pseudo-random pattern generation circuit for generating the reference parallel pseudo-random pattern whenthe first pulse passes through the one-shot circuit;

a delay circuit for delaying the receiving data; and a bit error detection circuit for detecting a bit error, which compares the receiving data outputted from the delay circuit with the reference parallel pseudo-random pattern.

* * * * *